(12) United States Patent
Klimke et al.

(10) Patent No.: US 6,808,326 B2
(45) Date of Patent: Oct. 26, 2004

(54) KEYBOARD WITH A SUPPORTING DEVICE

(75) Inventors: Jens Klimke, Falkensee (DE); Rudolf Merz, Berlin (DE)

(73) Assignee: Tektronix International Sales GmbH, Schaffhausen (CH)

( * ) Notice: Subject to any disclaimer, the term of this patent is extended or adjusted under 35 U.S.C. 154(b) by 0 days.

(21) Appl. No.: 10/421,282

(22) Filed: Apr. 22, 2003

(65) Prior Publication Data
US 2003/0219299 A1 Nov. 27, 2003

(30) Foreign Application Priority Data

May 22, 2002 (EP) .............................................. 02011297

(51) Int. Cl.[7] .............................................. B41J 29/02
(52) U.S. Cl. ...................................... 400/691; 400/693
(58) Field of Search .............................. 400/691, 693, 400/472; 341/21, 22; 361/680; 345/168, 169; 364/709.12

(56) References Cited

U.S. PATENT DOCUMENTS 5,111,361 A  *  5/1992  Kobayashi ................. 361/683
5,375,076 A  *  12/1994  Goodrich et al. ........... 361/681
5,975,780 A      11/1999  Fukami ...................... 400/691
6,144,551 A      11/2000  Kao .......................... 361/681
6,290,411 B1 *  9/2001  Shirai ........................ 400/681
6,460,221 B1 *  10/2002  Eromaki .................... 16/286

FOREIGN PATENT DOCUMENTS

EP          0360 384         3/1990

* cited by examiner

Primary Examiner—Anthony H. Nguyen
(74) Attorney, Agent, or Firm—Francis I. Gray

(57) ABSTRACT

A keyboard with a supporting device that rotates from a folded state to an unfolded state includes a housing for receiving the supporting device in the folded state such that the supporting device unfolds from the keyboard top about an angle greater than 270 degrees to the unfolded state to support the keyboard. The supporting device includes a slit-shaped contour having a curved region for riding on an interior surface of the keyboard bottom within the housing when moving between the folded and unfolded states and having a linear region to form a slit with the curved region for self-locking with the keyboard bottom in the unfolded state. When in the folded state the supporting device does not protrude above the keyboard top or beyond the keyboard edge, and provides an aesthetic exterior when attached to an information processing device in a transport mode.

13 Claims, 5 Drawing Sheets

KEYBOARD WITH A SUPPORTING DEVICE

BACKGROUND OF THE INVENTION

The present invention relates to interface devices for information processing apparatus, and more particularly to a keyboard with a supporting device.

Keyboards are used as input devices for computers and other information processing apparatus. Keyboards are used also in association with portable information processing apparatus where the keyboard is attached to the information processing apparatus for transport. In operation the keyboard is detached and is connected to the information processing apparatus via an electrical cable, thus being placed in a position convenient to an operator. Supporting devices for raising the rear of the keyboard to make the keyboard more comfortable for an operator to use are attached to the rear underside of the keyboard from whence they are unfolded. However there is a risk that these supporting devices may unfold accidentally during the transport of the information processing apparatus to which the keyboard is attached, damaging the supporting devices. Also the aesthetic appearance of the information processing apparatus is partially determined by the keyboard when attached to it in the transport mode, and the attachment of the supporting devices to the rear underside is visually unattractive as it disturbs the homogeneous appearance of the information processing apparatus.

What is desired is a keyboard having a supporting device mounted such as to reduce the risk of damage during transport while providing an aesthetic appearance.

BRIEF SUMMARY OF THE INVENTION

Accordingly the present invention provides a keyboard with a supporting device that rotates from a folded state to an unfolded state. The keyboard includes a housing for receiving the supporting device in the folded state such that the supporting device unfolds from the keyboard top about an angle greater than 270 degrees to the unfolded state to support the keyboard. The supporting device includes a slit-shaped contour having a curved region for riding on an interior surface of the keyboard bottom within the housing when moving between the folded and unfolded states and having a linear region to form a slit with the curved region for self-locking with the keyboard bottom in the unfolded state. When in the folded state the supporting device does not protrude above the keyboard top or beyond the keyboard edge, and provides an aesthetic exterior when attached to an information processing device in a transport mode.

The objects, advantages and other novel features of the present invention are apparent from the following detailed description when read in conjunction with the appended claims and attached drawing.

DETAILED DESCRIPTION OF THE INVENTION

Figure 1:
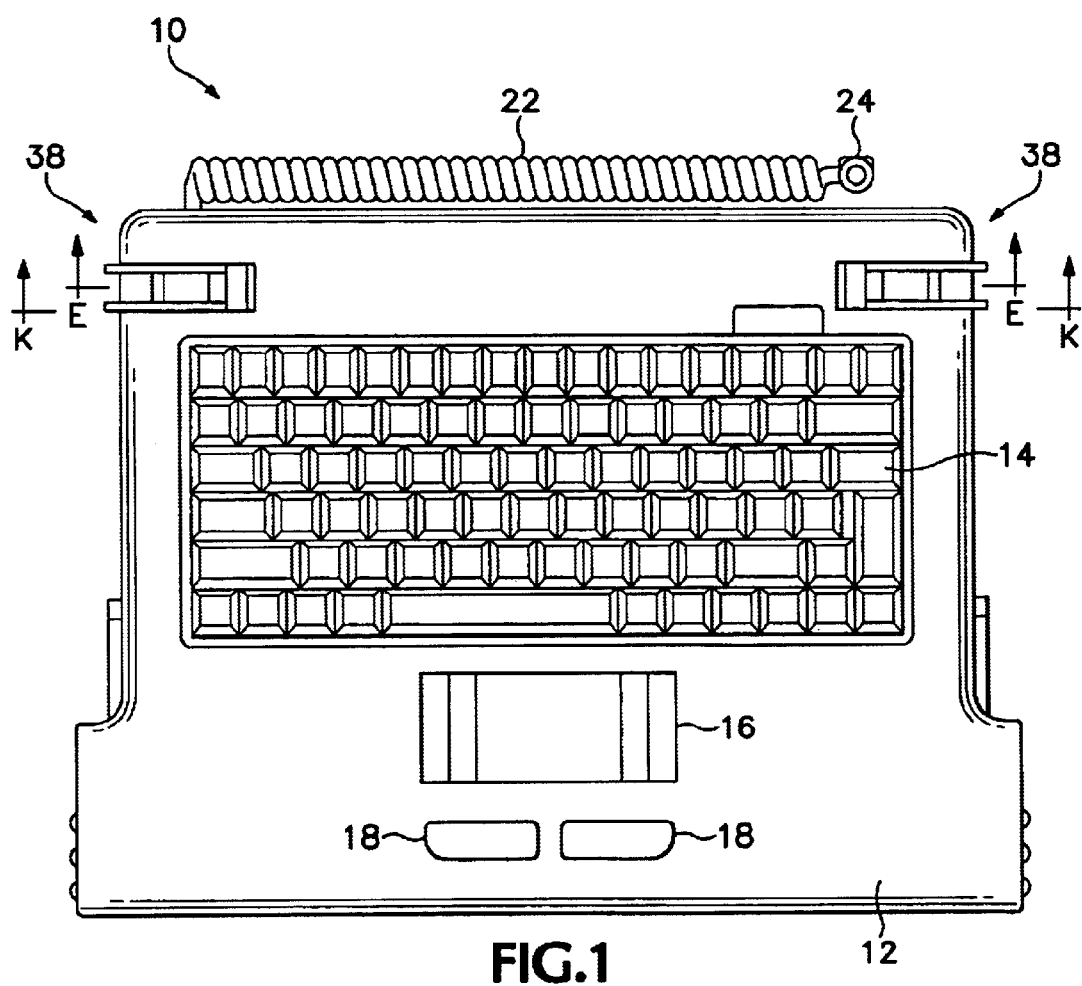
FIG. 1 is a top plan view of a keyboard according to the present invention.

Referring now to FIG. 1 a keyboard 10 has a top 12 with a keypad 14, a touch pad 16 and operating keys 18. A supporting device or foot 38 is provided on each side of the keyboard near the rear. A spiral electrical cable 22 has a connector 24 for connecting the keyboard to an information processing apparatus, such as a computer or protocol tester.

Figure 2A:
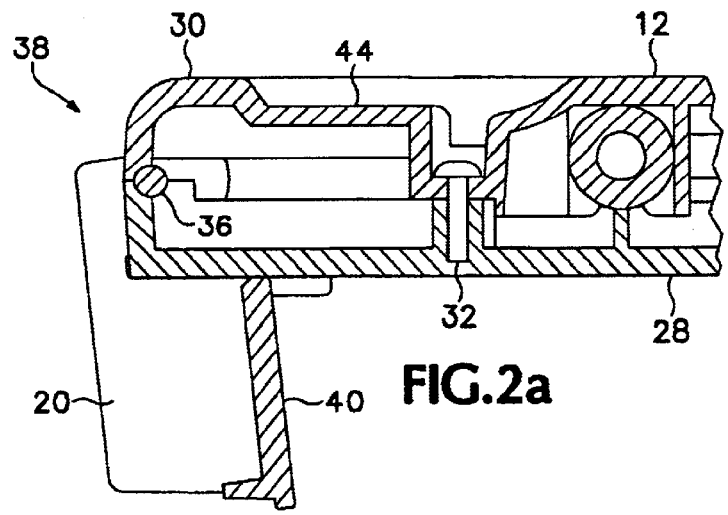
FIGS. 2a, 2b and 2c are cross-sectional views of the keyboard of FIG. 1 taken along section E—E illustrating a supporting device according to the present invention in various folding phases.
Figure 2B:
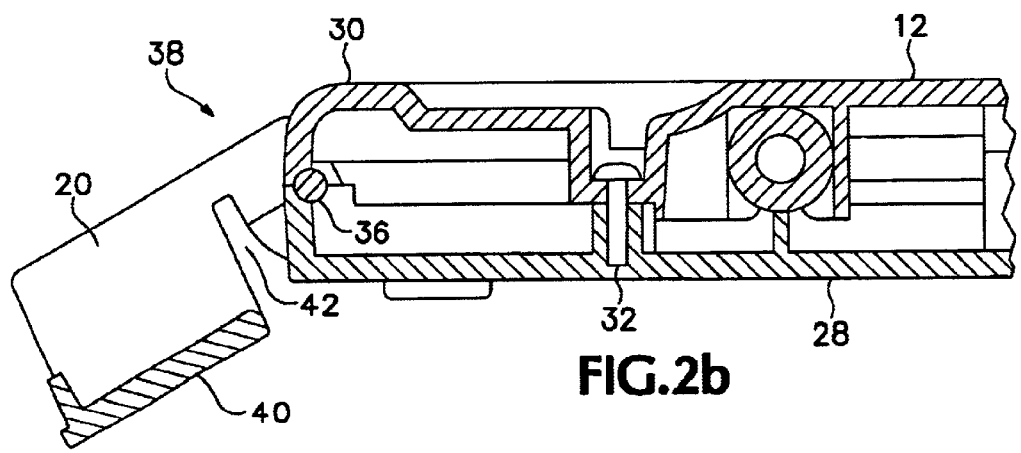
Figure 2C:
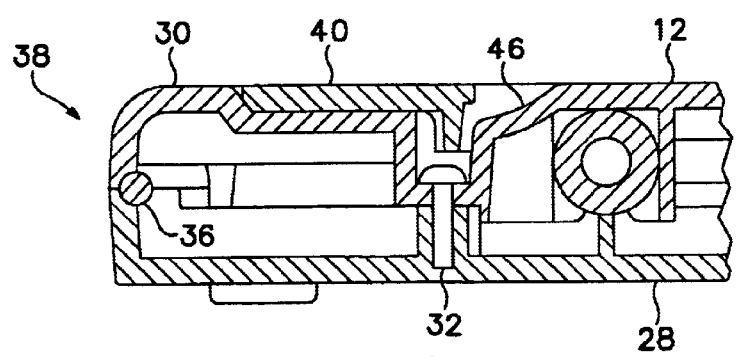

The details of the supporting foot 38 are shown in FIGS. 2a, 2b and 2c. The keyboard top 12 and bottom 28 are shown together with an additional housing part 30 which is securely attached to the keyboard 10 by suitable means, such as a screw 32. Each supporting foot 38 has a pair of supporting members 20 connected together by a connecting member 40, the supporting members being rotatably connected to the keyboard 10 via a hinge joint having a pivot 36. A slit-shaped recess 42 in the supporting members 20 engages the bottom 28 of the keyboard 10 to lock the supporting foot 38 in place in an unfolded state. The housing part 30 has a depression 44 in which the connecting member 40 is received when the supporting foot 38 is in a folded state for transport with an information processing apparatus. No element of the supporting foot 38 protrudes above the keyboard top 12 when in the folded state. The keyboard top 12 has a depression 46 adjacent the housing part 30 that facilitates manipulation, i.e., unfolding, of the supporting foot 38. The connecting member 40 serves as a grip for unfolding the supporting foot 38. The supporting foot 38 rotates more than 270 degrees between the folded and unfolded states and, due to the angular position of the supporting foot relative to the keyboard 10, self-locking occurs in the unfolded state.

Figure 3A:
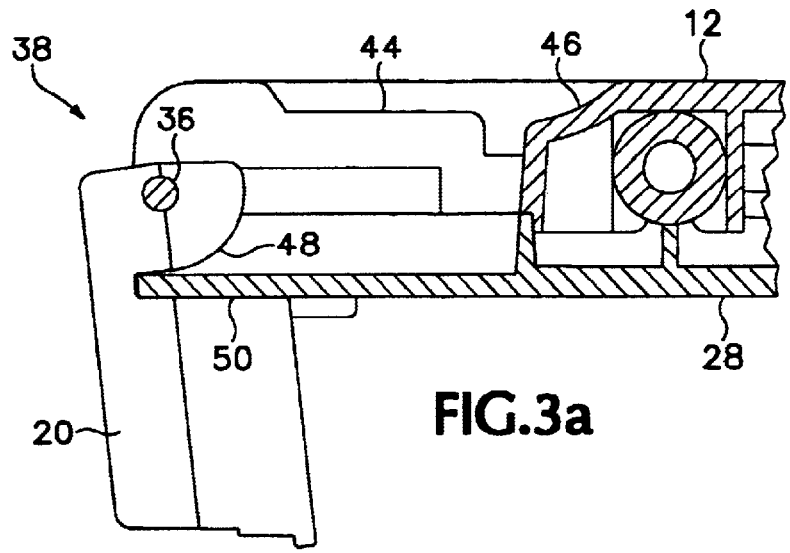
FIGS. 3a, 3b and 3c are cross-sectional views of the keyboard of FIG. 1 taken along section K—K illustrating the supporting device according to the present invention in various folding phases corresponding to FIGS. 2a, 2b and 2c.
Figure 3B:
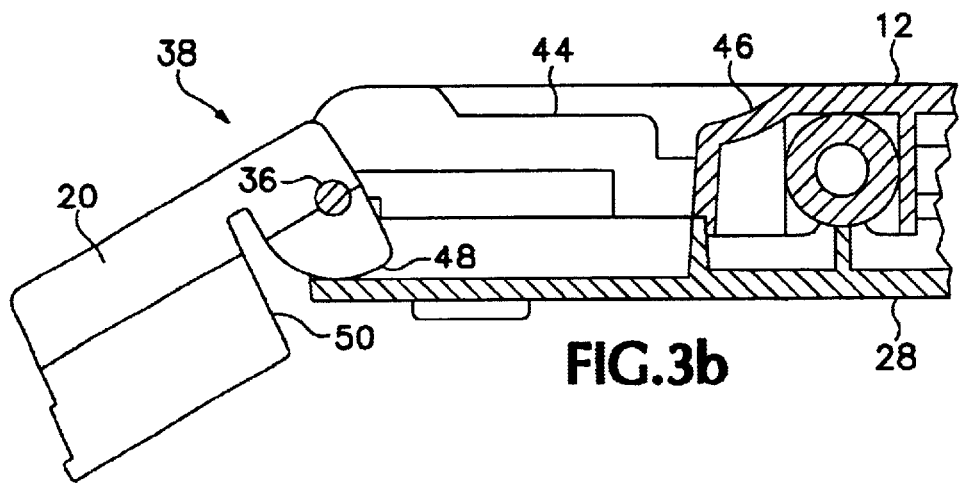
Figure 3C:
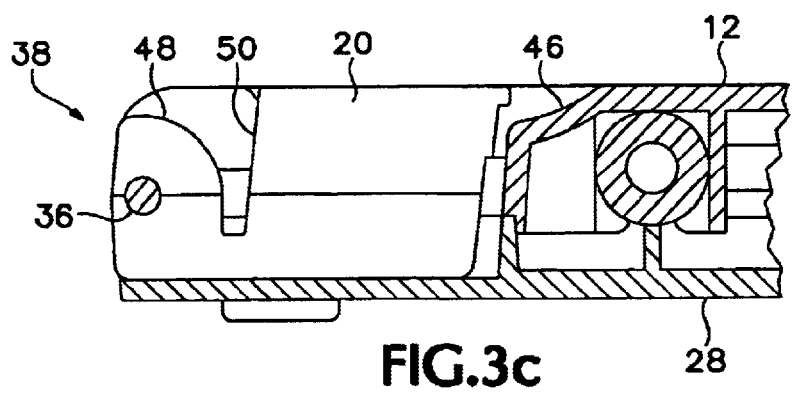

FIGS. 3a, 3b and 3c reveal that the contour of the slit-shaped recess 42 has a curved region 48 and a linear region 50. At the linear region 50 the supporting members 20 in the unfolded state support the keyboard bottom 28. The curved region 48 slides across the interior surface of the keyboard bottom 28 in unfolding and folding the supporting member 20. No portion of the supporting member 20 protrudes beyond the side of the keyboard when in the folded state.

Figure 4:
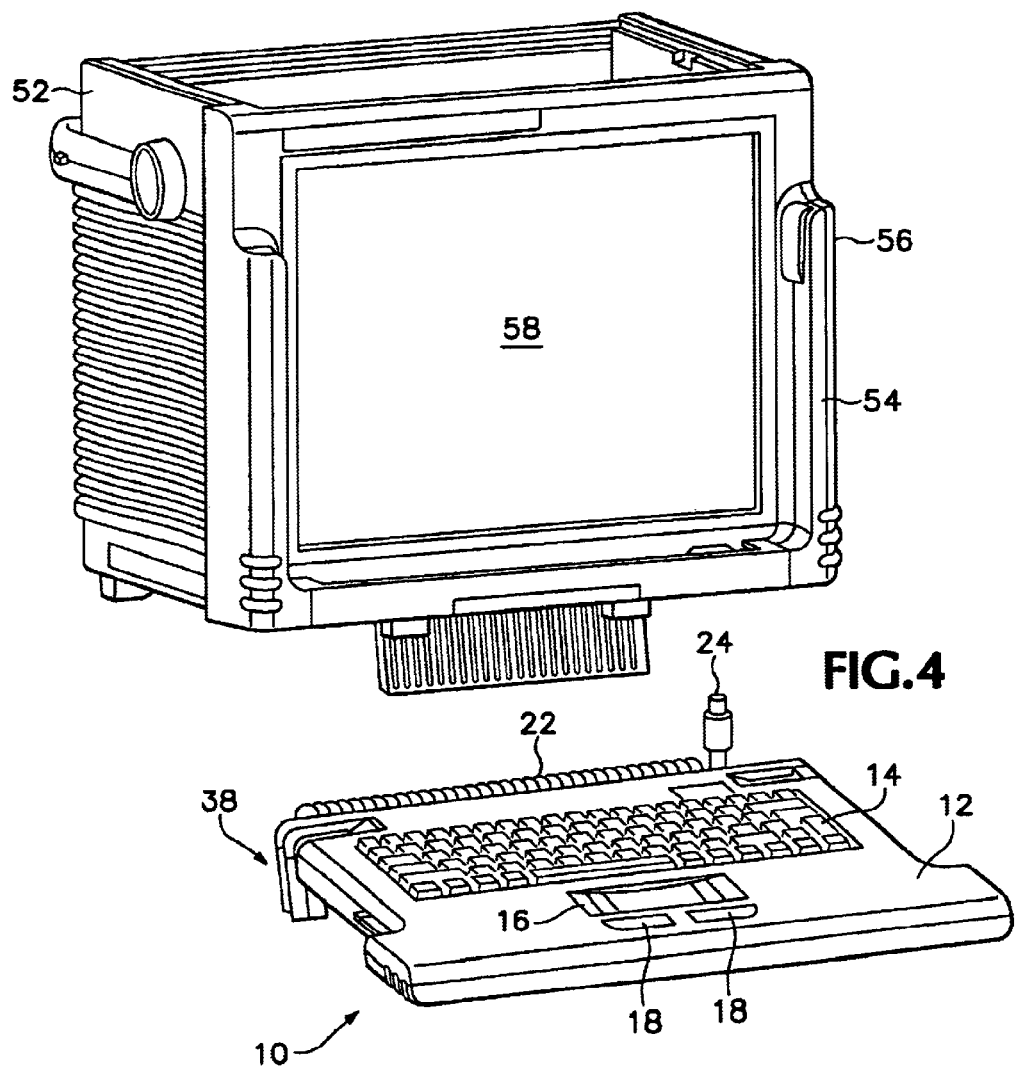
FIG. 4 is a perspective view of an information processing apparatus with the keyboard according to the present invention in an operational mode.
Figure 5:
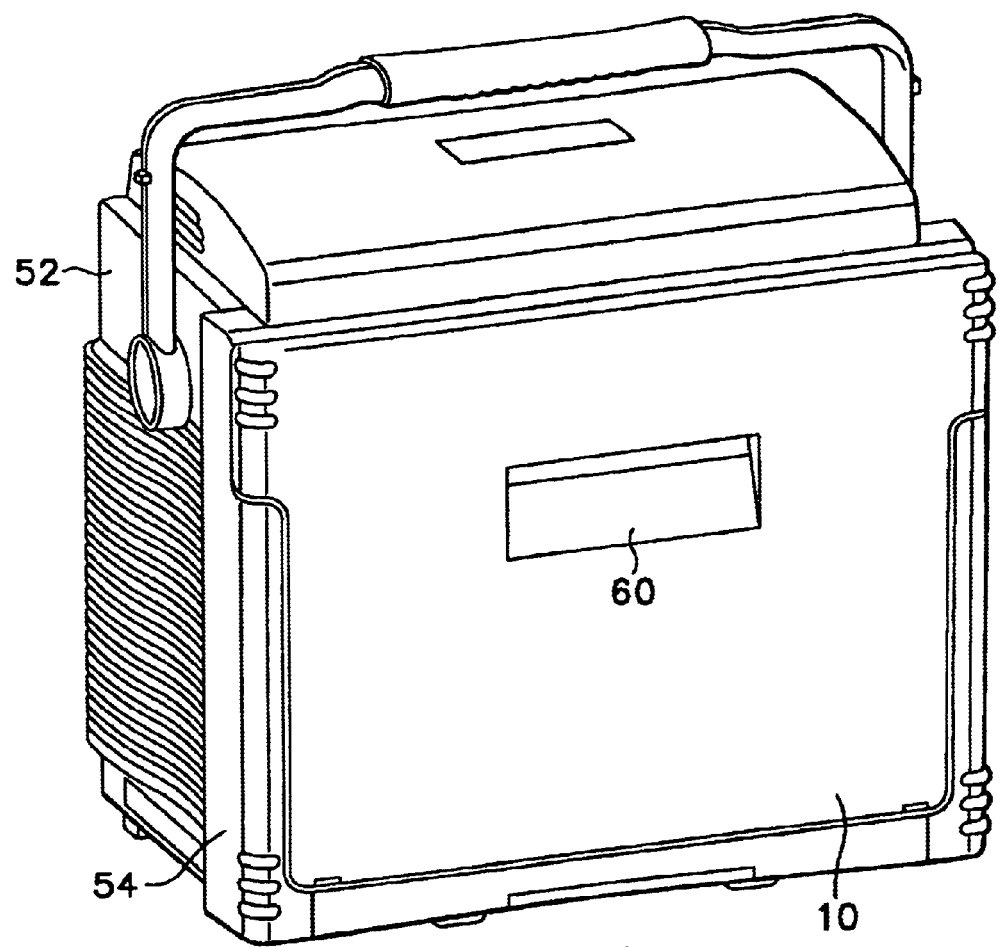
FIG. 5 is a perspective view of the information processing apparatus and keyboard of FIG. 4 according to the present invention in a transport mode.

In FIG. 4 an information processing apparatus 52 has a keyboard mount 54 in which the keyboard 10 may be inserted, the keyboard being retained by a snap mechanism 54 provided in a lateral guide of the keyboard mount. Such a keyboard mounting system is described in detail in co-pending U.S. patent application Ser. No. 10/422,184. In a transport mode the keyboard 10 covers and protects a display 58. As seen in FIG. 5 in the transport mode the keyboard 10 provides an aesthetic complement to the information processing apparatus 52, with the only observable feature being a grip 60 which serves as a means for manipulating the keyboard between the operational and transport modes with respect to the information processing apparatus.

Although the locations of the supporting feet 38 are shown at the sides of the keyboard 10, the housing part 30 may be mounted in such a location that the supporting feet may be rotated from either the back or front of the keyboard as well, the only requirement being that when in the folded position they do not protrude above the keyboard top or beyond the keyboard edges.

Thus the present invention provides a keyboard with a supporting device or foot that unfolds from the keyboard top to an end position to support the keyboard, the keyboard having a housing into which the supporting device folds with no protrusion above the keyboard top or beyond the keyboard edges when in the folded state, while leaving the keyboard bottom aesthetically pleasing when attached to an information processing apparatus in a transport mode.

What is claimed is:

1. A keyboard having a supporting device and having a top, bottom, front, rear and sides comprising:

a housing integral with the keyboard for receiving the supporting device; and means for unfolding the supporting device from a start position flush with the top of the keyboard in a folded state within the housing to an end position in an unfolded state after rotation about a pre-settable angle to support the keyboard.

2. The keyboard as recited in claim 1 wherein the housing is attached to the keyboard such that the supporting device is disposed in a location selected from the group consisting of the front, back or sides of the keyboard.

3. The keyboard as recited in claim 1 wherein the supporting device comprises a supporting member having a slot formed such that in the unfolded state the slot receives a portion of the keyboard bottom to support the keyboard.

4. The keyboard as recited in claim 3 wherein the slot comprises a slit-shaped contour for receiving the portion of the keyboard bottom.

5. The keyboard as recited in claim 4 wherein the slit-shaped contour comprises a curved region for riding on an inner surface of the keyboard bottom when moving between the folded and unfolded states.

6. The keyboard as recited in claim 5 wherein the slit-shaped contour further comprises a linear region upon which an exterior surface of the portion of the keyboard bottom is supported when in the unfolded state, the conjunction of the curved and linear region forming the slot.

7. The keyboard as recited in claim 1 wherein the pre-settable angle comprises an angle greater than 270 degrees.

8. The keyboard as recited in claim 1 wherein the supporting device is formed and pivoted such that in the folded state the supporting device does not protrude beyond an edge of the keyboard about which it is rotated.

9. The keyboard as recited in claim 3 wherein the supporting device further comprises:

a second supporting member; and a connecting member between the supporting members to form a supporting foot as the supporting device.

10. The keyboard as recited in claim 9 wherein the connecting member comprises an unfolding grip for the supporting foot when in the folded state.

11. The keyboard as recited in claim 9 wherein the housing comprises a depression for receiving the connecting member in the folded state so that the supporting device does not protrude above the keyboard top when in the folded state.

12. The keyboard as recited in claim 11 wherein the keyboard top includes a depression adjacent the housing for facilitating manipulation of the supporting device from the folded state.

13. The keyboard as recited in claim 1 wherein the supporting device comprises a pair of supporting feet located at rear lateral regions of the keyboard such that one of the supporting feet rotates about the one keyboard side and the other one of the supporting feet rotates about the other keyboard side so that the keyboard rear is raised when the supporting device is in the unfolded state.

* * * * *